United States Patent [19]
Hagiya

[11] Patent Number: 5,180,027
[45] Date of Patent: Jan. 19, 1993

[54] TRACTION CONTROL SYSTEM FOR MOTOR VEHICLES

[75] Inventor: Naoyuki Hagiya, Ageo, Japan

[73] Assignee: Akebono Brake Industry Co., Ltd., Tokyo, Japan

[21] Appl. No.: 593,566

[22] Filed: Oct. 5, 1990

Related U.S. Application Data

[63] Continuation of Ser. No. 300,430, Jan. 23, 1989, abandoned.

[30] Foreign Application Priority Data

Jan. 22, 1988 [JP] Japan .................. 63-10835

[51] Int. Cl.⁵ .............................................. B60K 28/16
[52] U.S. Cl. ............................. 180/197; 364/426.02
[58] Field of Search .................. 180/197; 364/426.02

[56] References Cited

U.S. PATENT DOCUMENTS

| | | | |
|---|---|---|---|
| 4,615,410 | 10/1986 | Hosaka | 180/197 |
| 4,682,667 | 7/1987 | Hosaka | 180/197 |
| 4,721,176 | 1/1988 | Kabasin et al. | 180/197 |
| 4,763,912 | 8/1988 | Matsuda | 180/197 |
| 4,768,608 | 9/1988 | Hrovat | 180/197 |
| 4,779,696 | 10/1988 | Harada et al. | 180/197 |
| 4,799,161 | 1/1989 | Hirotsu et al. | 180/197 |
| 4,811,808 | 3/1989 | Matsumoto et al. | 180/197 |
| 4,854,411 | 8/1989 | Ise et al. | 180/197 |
| 4,886,140 | 12/1989 | Leiber et al. | 180/197 |

FOREIGN PATENT DOCUMENTS

| | | | |
|---|---|---|---|
| 2832739 | 2/1980 | Fed. Rep. of Germany | 180/197 |
| 99757 | 6/1985 | Japan | 180/197 |
| 151159 | 8/1985 | Japan | 180/197 |
| 31869 | 2/1988 | Japan | 180/197 |

Primary Examiner—Mitchell J. Hill

[57] ABSTRACT

A traction control system for motor vehicles in which the occurrence of on-driving wheel speed is monitored during a time interval which begins when the traction control starts to a predetermined time period which elapses therefrom. In the event that no occurrence of no-driving wheel speed is detected during the aforementioned time interval, the throttle opening degree command value prevailing at the end of the time interval is decreased to a predetermined lower limit value in response thereto, while at the same time the control is changed to a low friction coefficient control mode.

9 Claims, 4 Drawing Sheets

TRACTION CONTROL SYSTEM FOR MOTOR VEHICLES

This application is a continuation of application Ser. No. 07/300,430, filed Jan. 23, 1989 now abandoned.

BACKGROUND OF THE INVENTION

1. Field of the Invention

This invention relates to a traction control system for motor vehicles, and more particularly it pertains to improvements in such a system adapted for a road surface having an extremely low friction coefficient or an uphill road surface having a low friction coefficient.

2. Description of the Prior Art

Known in prior art there is a traction control system for motor vehicles, which is utilized, when the motor vehicle runs on a low-friction road surface such as a frozen, snow-covered or muddy one, to prevent a slipping of the driven wheel, likely to occur when attempting to start or accelerate a motor vehicle, thereby enhancing the starting/accelerating performance as well as the running stability of the vehicle. In such a control system, the driven and non-driven wheel speeds are compared with each other, and when the former becomes higher than the latter by a predetermined amount, the driven wheel is judged as slipping, and thereupon the opening of the engine throttle is reduced to decrease the engine output so that the slip of the driven wheel is restrained, as disclosed in British Patent Publication No. 2,130,757, for example.

More specifically, with the foregoing traction control system, a throttle opening/closing control is effected by using, as control threshold value for the driven wheel speed, a value Vs provided by adding a predetermined value Vk to non-driven wheel speed Vv which is equal to the vehicle speed, as shown in FIG. 1, for example. In FIG. 1, when the accelerator pedal is depressed at time to the throttle opening degree is excessive, the driven wheel is caused to slip and thus traction control is commenced at time t2 when the driven wheel speed exceeds the above-mentioned control threshold value Vs, so that the throttle opening degree is decreased; and thereafter, the throttle opening/closing control is performed such that the driven wheel speed Vr approaches the control threshold value Vs through comparison of the driven wheel speed Vr and the control threshold value Vs. Thus, the throttle closing control is effected at a predetermined closing speed whenever the driven wheel speed Vr exceeds the control threshold value Vs, whereas the throttle opening control is effected at a predetermined opening speed whenever the driven wheel speed reaches a high peak where it changes from an increasing value to a decreasing value.

However, the foregoing conventional traction control system has the following drawbacks in that even when the motor vehicle starts on a frozen or snow-covered road surface having an extremely low friction coefficient (hereafter; an "extremely low-$\mu$" road surface) or an uphill road surface having a low friction coefficient (hereafter a "low-$\mu$" road surface) the above-described type of traction control is effected in a control mode similar to that used when the motor vehicle starts on a normal road surface instead of a extremely low-$\mu$ road surface or a low-$\mu$ uphill road surface so that control threshold value for the driven wheel speed Vr and the opening/closing speed for the throttle opening/closing control for the cases where the motor vehicle starts on an extremely low-$\mu$ road surface or a low-$\mu$ uphill road surface, are set up to be those suitable for the cases where the motor vehicle starts on a normal road surface. Thus when the throttle command value is too greatly and sharply increased or decreased an excessive slip of the driven wheel speed Vr could occur in frequent repetition; and it becomes difficult to rapidly constrain the driven wheel in such an optimum slipping state that the driven wheel speed Vr properly exceeds the non-driven wheel speed Vv; consequently, a long time is taken before the non-driven wheel speed Vv occurs, and even if the traction control is commenced at the time t2, the motor vehicle is unable to move until time t4.

SUMMARY OF THE INVENTION

Accordingly, it is an object of the present invention to provide a novel and improved traction control system for motor vehicles, which would start, when it is detected that the motor vehicle starts or accelerates on an extremely low-$\mu$ road surface or low-$\mu$ uphill road surface; then, the control mode of the system is switched to a gentler one, suitable for the friction coefficient of such a road surface, thereby making it possible to easily constrain the driven wheel to be in an optimum slipping state even when the motor vehicle starts or accelerates on an extremely low-$\mu$ road surface or low-$\mu$ uphill road surface.

In the traction control system embodying the present invention, the non-driven wheel speed is monitored during the time interval from a point when traction control is started to a time point when a predetermined time period elapses therefrom; if no non-driven wheel speed is generated during the above time interval, then the throttle opening degree command value prevailing at the end of the foregoing time interval is decreased down to a predetermined lower limit value in response thereto, while at the same time the control mode of the system is changed to a low-$\mu$ control mode.

According to the present invention, there is no non-driven wheel speed detected during the time interval from a time point when traction control is commenced to a time point when a predetermined time period elapses therefrom, and the road surface on which the motor vehicle starts or is running is judged as an extremely low-$\mu$ road surface or a low-$\mu$ uphill road surface; then, and when such judgement is made, the control mode of the traction control system is automatically switched to a gentler one suitable for the friction coefficient of such as an extremely low-$\mu$ road surface or a low-$\mu$ uphill road surface, whereby the driven wheel is rapidly restrained from excessively slipping to an optimum slipping state even when the motor vehicle starts or runs on an extremely low-$\mu$ road surface or a low-$\mu$ uphill road surface.

DESCRIPTION OF THE PREFERRED EMBODIMENTS

Figure 1:
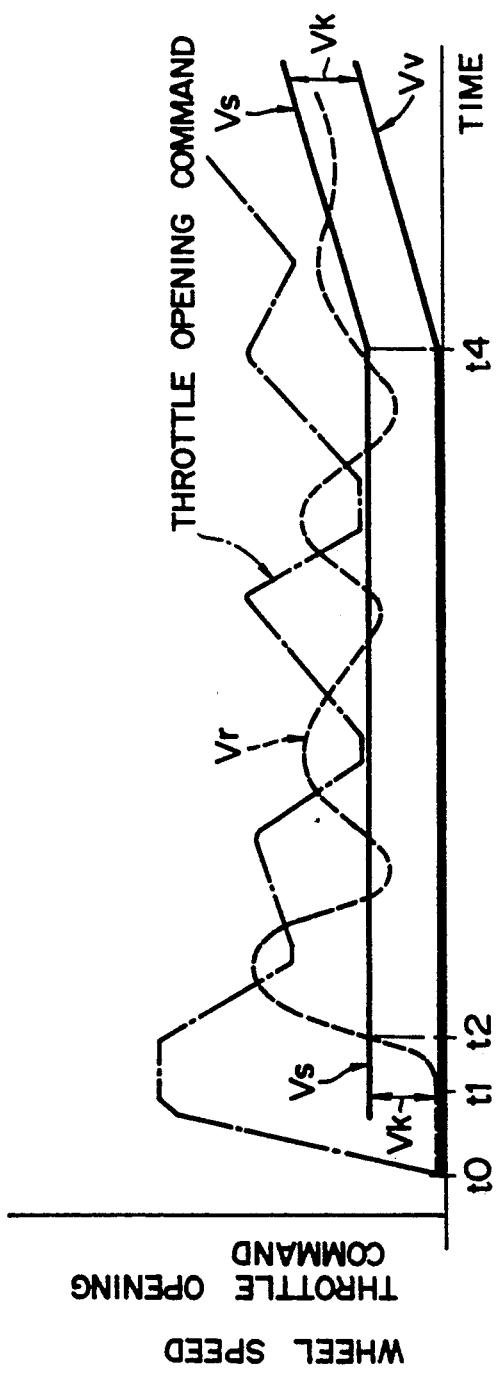
FIG. 1 is a timing chart useful for explaining a conventional traction control system.
Figure 2:
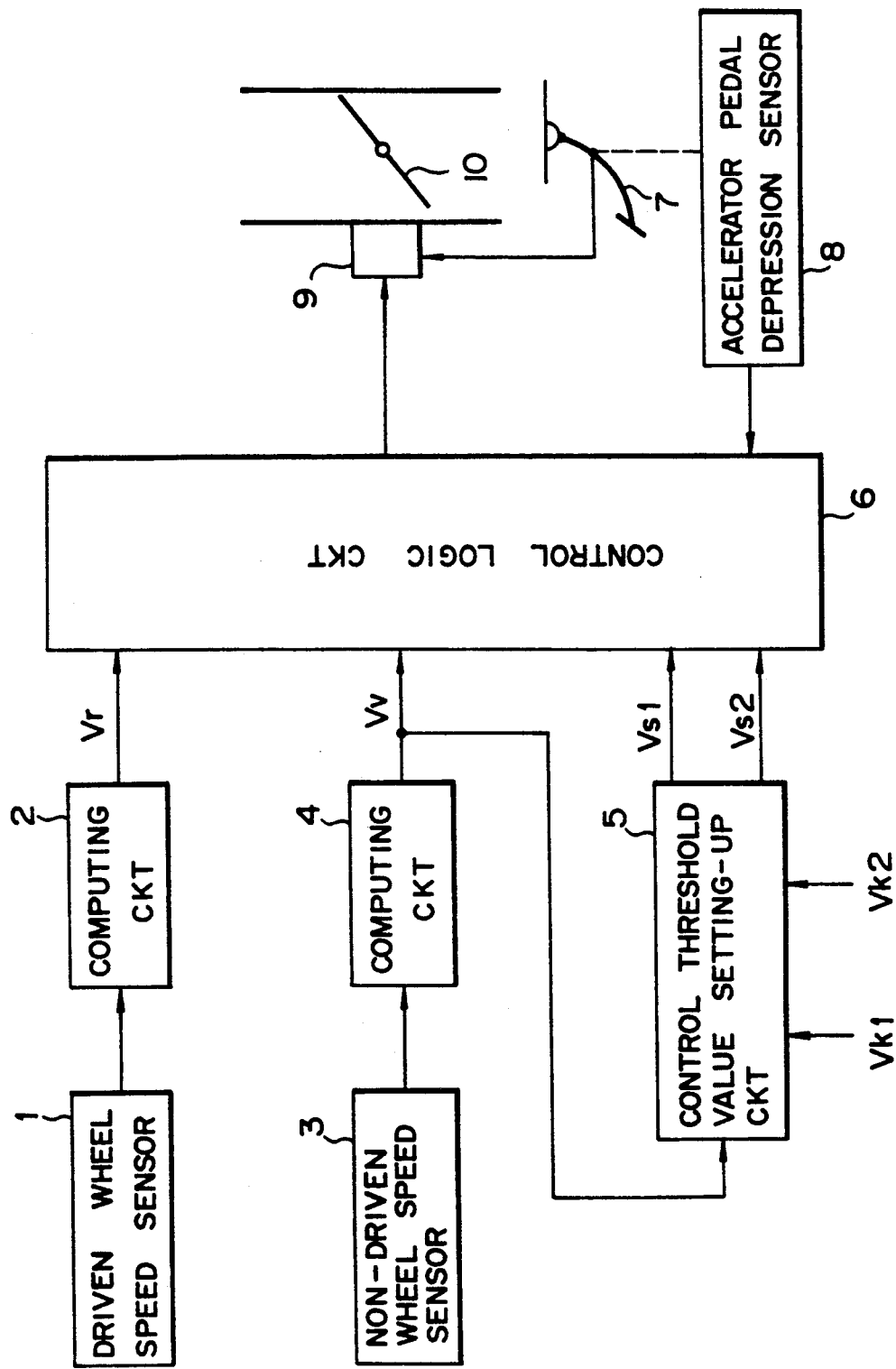
FIG. 2 is a block diagram showing the traction control system according to an embodiment of the present invention.

Referring to FIG. 2, there is shown, in a block diagram, the arrangement of a microcomputer-based traction control system which is applicable to implement the present invention, wherein the driven wheel speed is detected as a frequency signal by a driven wheel speed sensor 1 and the frequency signal is passed to a computing circuit 2 in which the driven wheel speed Vr is computed on the basis of the frequency signal.

The non-driven wheel speed is also detected by a non-driven wheel speed sensor 3 as a frequency signal which in turn is passed to a computing circuit 4 in which non-driven wheel speed Vv is computed on the basis of the frequency signal. For a four-wheeled vehicle, for example, the non-driven wheel speed Vv may be computed to represent the higher one of lefthand and righthand non-driven wheel speeds, for example.

The non-driven wheel speed Vv is provided to a control threshold value setting-up circuit 5 in which predetermined values Vk1 and Vk2 (where Vk1 > Vk2) are added to the non-driven wheel speed Vv to set up a control threshold value Vs1 for the driven wheel speed in the normal control mode and a control threshold value Vs2 for the driven wheel speed in low-$\mu$ control mode. The driven wheel speed Vr, non-driven wheel speed Vv, and control threshold values Vs1 and Vs2 are inputted to a control logic circuit 6 to which is also inputted the output of a sensor 8 which represents the extent of depression of accelerator pedal 7.

In response to these input signals, the control logic circuit 6 operates to drive a throttle driving mechanism 9 so that opening/closing control of a throttle valve 10 is effected so as to control the engine output when the motor vehicle starts or accelerates.

Figure 3:
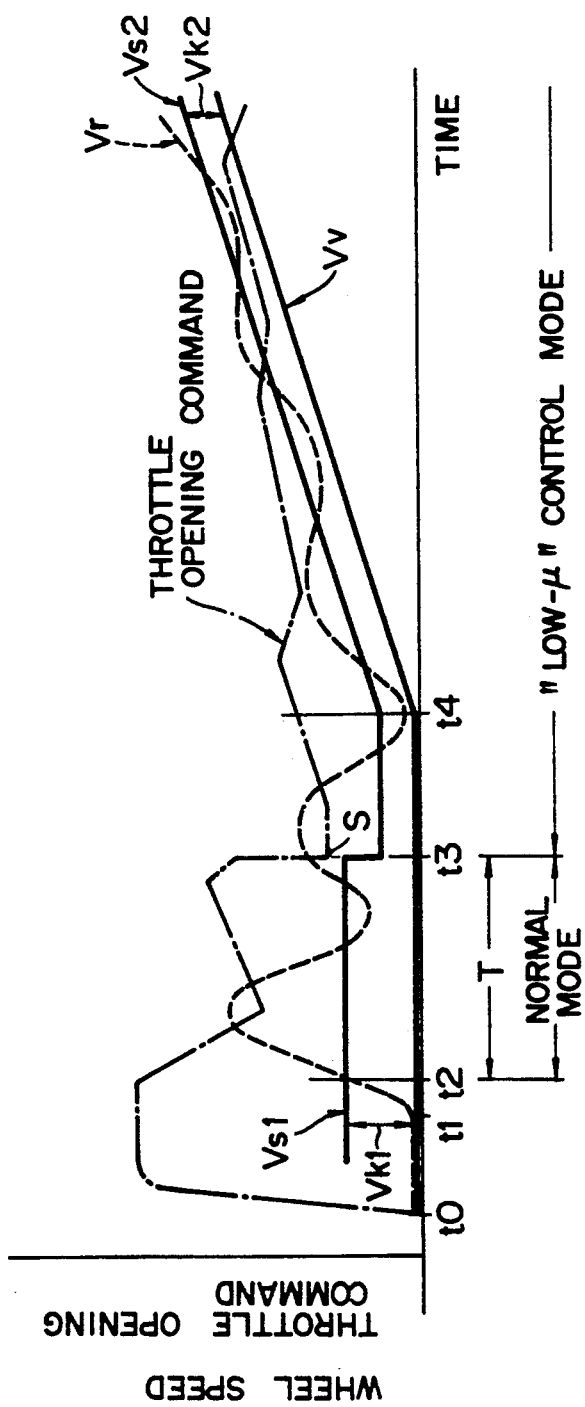
FIG. 3 is a timing chart useful for explaining the traction control system of the present invention shown in FIG. 2.

FIG. 3 is a timing chart useful for explaining traction control performed in accordance with an embodiment of the present invention. In this embodiment, time T, for judging an extremely low-$\mu$ road surface or a low-$\mu$ uphill road surface, is preset to be, say, one second; counting-up by a timer starting at a time point t2 when driven wheel speed Vr exceeds a threshold value Vs1 and traction control is commenced; thereafter, the traction control is switched from normal mode to a mode for low-$\mu$ road surface (referred to as "low-$\mu$ control mode" hereinafter) at a time point t3 when the above judging time T has elapsed while non-driven speed Vv remains zero so that the control command values are changed as follows:

1) The throttle opening degree command at the time point t3 is reduced to a value S for providing a minimum torque output of the engine, and the traction control is restarted by using this value S as an initial value for the low-$\mu$ control mode.

2) The control threshold value for the driven wheel speed is set to be a value Vs2 (=Vv+Vk2) which is smaller by a predetermined value than the control threshold value Vs1 for the normal mode (where Vk2<Vk1).

3) The throttle opening/closing speed in the throttle opening degree control is set to be lower than that in the normal mode.

In this way, the traction control is effected in the control mode suitable for an extremely low-$\mu$ road surface or a low-$\mu$ uphill road surface, so that the time interval from the time point t2 when the traction control is commenced to a time point t4 when the non-driven wheel speed Vv occurs.

The traction control may be switched from the above low-$\mu$ control mode to the normal control mode either when the acceleration of the non-driven wheel speed Vv exceeds a predetermined value or when accelerator pedal remains non-depressed longer than a predetermined time. Thus, even when the motor vehicle stops temporarily during the low-$\mu$ control mode, the traction control can be restarted in the low-$\mu$ control mode if the time for which the accelerator pedal remains non-depressed is shorter than the predetermined time.

Figure 4:
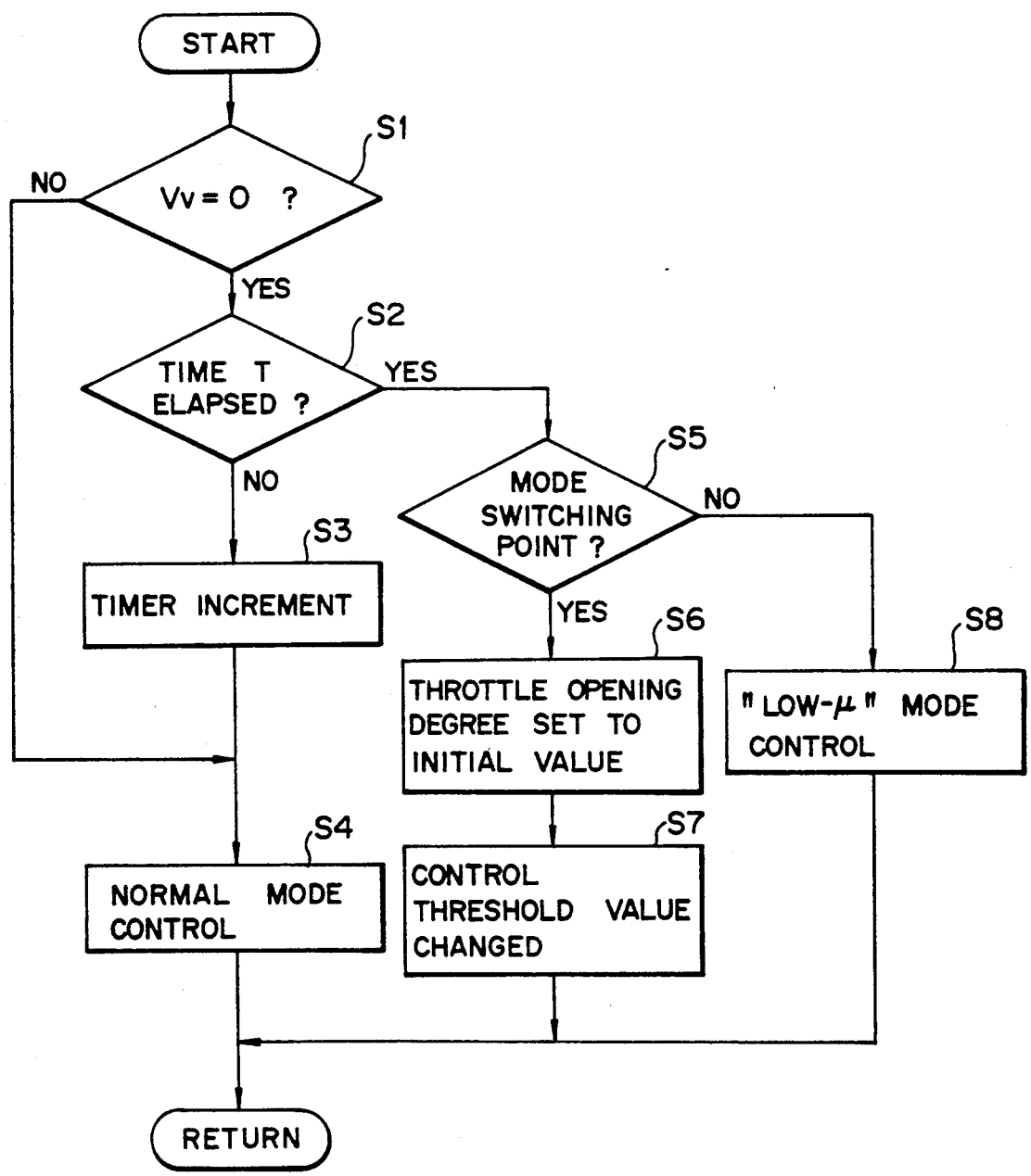
FIG. 4 is in a flow chart useful for explaining the operation of the embodiment of the present invention.

FIG. 4 is a flow chart useful for explaining another embodiment, which will be described with reference to FIG. 3.

First, the timer starts at the time point t2 when the traction control is commenced. At step S1, a judgement is made as to whether the non-driven wheel speed Vv is being generated. If the non-driven wheel speed Vv is not being generated, namely, if the result of the judgment at step S1 is "YES", then the control procedure proceeds to step S2. At step S2, where a judgement is made as to whether the preset time for judging an extremely low-$\mu$ road surface or a low-$\mu$ uphill road surface has elapsed from the time point t2 when the traction control was commenced. When the judging time T has not yet elapsed, the control procedure proceeds to step S3. At step S3, an increment is applied to the timer count, and at step S4, the traction control is performed in the normal control mode.

At a time point t3 (FIG. 3) when the judging time T has elapsed from the time point t2, if the result of the judgment at the step S2 is "YES", then the control procedure proceeds to step S5. At step S5, a judgment is made as to whether a mode switching point is reached. At time point t3 when the above judging time T has elapsed from the time point t2 when the traction control was commenced, that judgment turns out to be the above mode switching point. Thus, if at the time point t3, the result of the judgment at the step S5 is "YES", then the control procedure proceeds to steps S6. At step S6, the throttle opening degree command value prevailing at that time is reduced to a predetermined opening degree value S, which is used as an initial value for the subsequent control. Further, at step S7, the control threshold value for the driven wheel speed is switched and set to be a value Vs2 which is less than the threshold value Vs1 for the normal control mode.

After the time point t3, or at the mode switching point, the result of if the judgment at the step S5 is "NO", then the control procedure proceeds to step S8, so that the control is performed in the low-$\mu$ control mode in which the throttle opening/closing speed is made to be lower than that before the time point t3 is reached.

As explained above, in accordance with this embodiment, the timer is operated at the time point t2 when the traction control is commenced; if it is judged that the road surface on which the motor vehicle starts or accelerates is an extremely low-$\mu$ road surface or a low-$\mu$ uphill road surface in the case where the non-driven wheel speed Vv is not generated (i.e., in the case where the motor vehicle cannot start) even when a predetermined time which is preset to say one second has elapsed, then thereupon, the control mode is switched to the low-$\mu$ control mode suitable for the extremely low-$\mu$ road surface/low-$\mu$ uphill road surface; and thus even for an extremely low-μ road surface/low-μ uphill road surface, it is possible to restrain an excessive slip of the driven wheel and rapidly constrain the driven wheel to be in an optimum slipping state, thereby greatly improving the start/accelerating performance of the motor vehicle.

Although in the foregoing embodiment, description has been made of the case where the threshold value Vs1 is switched to value Vs2 at the time point 3, and thereafter the throttle opening/closing speed is made to be lower than that for the normal control mode, it is also possible that the throttle opening/closing speed may simply be made to be lower than that for the normal control mode without effecting the above-mentioned threshold value switching.

While the present invention has been illustrated and described with respect to some specific embodiments thereof, it is to be understood that the present invention is by no means limited thereto but encompasses all changes and modifications which will become possible within the scope of the appended claims.

I claim:

1. A traction control system for motor vehicles, wherein a control threshold value for a driven wheel speed is selected based upon a non-driven wheel speed which occurs when the motor vehicles start, and a throttle valve opening is controlled by a throttle driving mechanism so that a driven wheel speed approaches said control threshold value, thereby preventing an excessive slip of the driven wheel when the motor vehicle starts, said traction control system comprising:

first means for measuring a time period in which the traction control is started and during said time period the non-driven wheel speed is detected as being zero and for providing a signal at a time point when the measurement of said time period becomes equal to or exceeds a predetermined value, wherein said predetermined value measures a point in time when traction control begins to a point where said time period elapses, wherein said predetermined value is the difference between the control threshold value for the driven wheel speed and the control threshold value for a normal mode; and second means for decreasing said throttle opening degree down to a predetermined lower limit value for a low μ control mode in response to said signal provided by said first means, thereby changing the traction control to a controlling mode for a coefficient of friction for a road surface, said control threshold value of the driven wheel speed dropping from a high level to and approaching the non-driven wheel speed level during said time period.

2. A traction control system according to claim 1, wherein the control threshold value for the driven wheel speed is set up by adding a predetermined value to the non-driven wheel speed.

3. A traction control system according to claim 1, wherein a throttle closing control is performed from a time point when the increasing driven wheel speed exceeds said control threshold value, and the throttle opening control is performed from a time point when a high peak of the driven wheel speed occurs where the driven wheel speed is changed from an increase to a decrease.

4. A traction control system for motor vehicles according to claim 1, wherein the throttle opening/closing speed for a low-μ control mode is made to be lower than that for a normal control mode.

5. A traction control system according to claim 1, wherein the control threshold value for the driven wheel speed in a normal control mode is set up by adding a predetermined first value to the non-driven wheel speed, and the control threshold value for the driven wheel speed in a low-μ control mode is set up by adding a predetermined second value to the non-driven wheel speed, said predetermined second value being lower than said pre-determined first value.

6. A traction control system according to claim 1, wherein the traction control is returned from a low-μ control mode to the normal control mode when an acceleration of the non-driven wheel exceeds a predetermined value during the low-μ control mode.

7. A traction control system according to claim 1, further including an accelerator pedal and wherein the traction control is returned from a low-μ control mode to a normal control mode when said accelerator pedal is not depressed more than a predetermined period of time during the low-μ control mode.

8. A traction control system for motor vehicles, comprising:

(a) means for setting up, a first and then a second control threshold value for a driving wheel speed, a value provided by adding a predetermined first value to a non-driven wheel speed when the motor vehicle starts, and a value provided by adding a predetermined second value to said non-driven wheel speed, said value being less than said first value;

(b) means for starting traction control at a time point when the increasing driven wheel speed first exceeds said first control threshold value, performing throttle closing control at a predetermined first closing speed, and measuring a period of time during which the non-driven wheel speed is not generated from the time point when the traction control is commenced;

(c) means for performing a throttle opening control at a predetermined first opening speed whenever a high peak of the driven wheel speed occurs where the driven wheel speed is changed from an increase to a decrease, before the period of time during which the non-driven speed is not longer than a predetermined period of time, and performing throttle closing control at said first closing speed whenever the increasing driven wheel speed exceeds said first control threshold value, of the driven wheel speed, said control threshold value dropping from a high level to and approaching the non-driven wheel speed level during said time period; and (d) means for reducing the throttle opening degree to a preset lower limit value when the non-driven wheel speed is not generated for said predetermined period of time, and thereafter, with said second threshold value as reference, performing throttle control for opening and/or closing the throttle at a second opening speed or at a second closing speed lower than said first opening speed or said first closing speed.

9. A traction control system according to claim 8, wherein the control threshold value for the driven wheel speed changes from said first control threshold value to said second control threshold value when there is no non-driven wheel speed for one second from the time point when the traction control commences.

* * * * *